(12) United States Patent
Gonçalves Martins et al.

(10) Patent No.: US 11,325,820 B2
(45) Date of Patent: May 10, 2022

(54) BEVERAGE DISTRIBUTION SYSTEM WITH COMPOSED DRINKING RECIPIENTS, AND PROCESS OF OPERATION THEREOF

(71) Applicant: NOVADELTA—COMÉRCIO E INDÚSTRIA DE CAFÉS, LDA, Lisbon (PT)

(72) Inventors: Marco Filipe Gonçalves Martins, Pedreiras (PT); Rui Miguel Nabeiro, Campo Maior (PT); Cláudia Figueira Barros Dos Reis, Algés (PT); João André De Figueiredo Branco, Moscavide (PT)

(73) Assignee: NOVADELTA-COMÉRCIO E INDÉSTRIA DE CAFÉS, LDA, Lisbon (PT)

( * ) Notice: Subject to any disclaimer, the term of this patent is extended or adjusted under 35 U.S.C. 154(b) by 0 days.

(21) Appl. No.: 17/264,350

(22) PCT Filed: Jul. 30, 2019

(86) PCT No.: PCT/PT2019/050022
§ 371 (c)(1),
(2) Date: Jan. 29, 2021

(87) PCT Pub. No.: WO2020/027676
PCT Pub. Date: Feb. 6, 2020

(65) Prior Publication Data
US 2021/0292150 A1 Sep. 23, 2021

(30) Foreign Application Priority Data
Aug. 1, 2018 (PT) .......................................... 110897

(51) Int. Cl.
*B67D 1/06* (2006.01)
*A47G 19/22* (2006.01)

(52) U.S. Cl.
CPC ........... *B67D 1/06* (2013.01); *A47G 19/2205* (2013.01); *B67D 2210/00065* (2013.01)

(58) Field of Classification Search
CPC ....................... B67D 1/06; B67D 2210/00065
(Continued)

(56) References Cited

U.S. PATENT DOCUMENTS 8,151,838 B2 * 4/2012 Seaborne ........... A47G 19/2205
141/350
9,663,264 B2 * 5/2017 Springer .............. B67D 1/1275
(Continued)

FOREIGN PATENT DOCUMENTS

CA         3 024 415 A1    11/2017
DE    10 2009 048 233 A1    4/2010
(Continued)

OTHER PUBLICATIONS

International Search Report of PCT/PT2019/050022 dated Nov. 19, 2019 [PCT/ISA/210].
(Continued)

*Primary Examiner* — Timothy L Maust
(74) *Attorney, Agent, or Firm* — Sughrue Mion, PLLC

(57) ABSTRACT

A beverage distribution system for preparation of espresso coffee and similar aromatic beverages, including a drinking recipient (1, 1'), for example of type glass, cup, or similar, a beverage discharge disposition (2) operatively associated with a beverage preparation device (3), whereby the beverage discharge disposition is provided so that the beverage discharge flow impinges, with a given flow pressure, a flow regulation disposition (12) on the base region (11) of the drinking recipient (1, 1') along a direction opposite gravity, whereby the drinking recipient has first and second recipient parts (11, 12) adapted to be removably retained and that, in an assembled condition, provide fluid connection through a
(Continued)

flow passageway (110) that develops along a single direction and to confine the beverage flow downstream of flow constrain means (16) and upstream of the entry of beverage flow in the region of the base wall (111) of the collection space.

22 Claims, 9 Drawing Sheets

(58) Field of Classification Search
USPC .......................................................... 141/113
See application file for complete search history.

(56) References Cited

U.S. PATENT DOCUMENTS

| | | | |
|---|---|---|---|
| 9,694,931 B2* | 7/2017 | Springer | A47G 19/2205 |
| 9,957,149 B2* | 5/2018 | Park | A47G 19/2205 |
| 10,239,742 B2* | 3/2019 | Dresser | B67D 1/0888 |
| 10,501,308 B2* | 12/2019 | Song | A47G 19/22 |
| 10,611,619 B2* | 4/2020 | Bolender | A47G 19/2205 |
| 2018/0118551 A1* | 5/2018 | Jammes | B67D 1/1422 |
| 2019/0352162 A1* | 11/2019 | Lau | B01F 3/04808 |

FOREIGN PATENT DOCUMENTS

| | | |
|---|---|---|
| EP | 1 991 094 B1 | 8/2009 |
| EP | 2 120 652 B1 | 12/2011 |
| EP | 2 029 470 B1 | 8/2016 |
| WO | 2009/143164 A1 | 11/2009 |
| WO | 2016/071880 A1 | 5/2016 |

OTHER PUBLICATIONS

Written Opinion of PCT/PT2019/050022 dated Nov. 19, 2019 [PCT/ISA/237].

* cited by examiner

BEVERAGE DISTRIBUTION SYSTEM WITH COMPOSED DRINKING RECIPIENTS, AND PROCESS OF OPERATION THEREOF

CROSS REFERENCE TO RELATED APPLICATIONS

This application is a National Stage of International Application No. PCT/PT2019/050022, filed Jul. 30, 2019, claiming priority to Portuguese Patent Application No. 110897, filed Aug. 1, 2018.

FIELD OF THE INVENTION

The present invention refers to the field of beverage distribution systems, in particular systems for preparation of beverages based upon single portions of precursor edible substances, such as for example espresso coffee and similar, presenting beverage discharge means to the interior of a drinking recipient along a direction substantially opposite to the gravity force.

BACKGROUND OF THE INVENTION

It is known to provide a beverage discharge along a direction contrary to the gravity force, and through the wall of a drinking recipient.

The integration of flow regulation means on the beverage recipient wall, adapted so that only provide flow passageway in said direction contrary to the gravity force, suggests several problems to be solved whereby the prior art presents several solutions to several aspects that matters solving on a beverage discharge disposition of this type.

In particular, in the case of aromatic beverages, such as for example espresso type coffee, this beverage discharge is a relevant process with potential impact upon the beverage quality obtained in the drinking recipient. In fact, in particular in the case of espresso type coffee, the main characteristics of the discharge flow determines several aspects such as the production of créme and retention thereof in the cup, and the temperature variation as a result of exposition to air during the discharge to the cup.

Document EP 1991094 B1 discloses a drinking recipient adapted so that can be filled from the base and presenting a sealable base wall for such purpose, whereby the beverage is injected with enough pressure to open a valve provided as flow regulation element of beverage discharge flow.

Document EP 2029470 B1 discloses a system of the type of the present invention. In particular, the drinking recipient presents a base region adapted so that can be retained on a beverage discharge disposition, whereby said disposition presents guides configured so as to cooperate with complimentary guides on the base region of drinking recipient so as to guide the displacement of the discharge injector with relation to the recipient, by means of rotation of the recipient on said formation, so that the discharge injector penetrates in the charge opening and the single-way valve of the recipient. In particular, the exterior surface on the base region of beverage recipient, presents two guide formations configured in form of "L" that develops along a direction transversal to the gravity force, whereby said guide formations operate with corresponding projections of tooth type provided on a surface of said beverage discharge disposition. From said disposition results that a glass can be placed at a first angular position and manually rotated afterwards along a given angular direction and by a given angle until a second angular position where it gets retained, and vice-versa for releasing the glass after beverage discharge.

Document EP 2120652 B1 discloses another system of the type of the present invention, whereby the base region of said drinking recipient can be retained by means of a thread on a placement disposition configured as brewing device so that can collect a capsule containing a beverage percussing edible substance, downstream of the fluid discharge and upstream of base portion of drinking recipient. Moreover, the base region of said placement disposition presents three transversal projections developing inwards that, in correspondence with three transversal projections associated with a fluid discharge disposition and developing outwards, provide the placement and retention of said placement disposition on the fluid discharge disposition by means of rotation of said placement disposition around a respective central axis, thereby providing connection in fluid communication of the upstream fluid discharge with the drinking recipient downstream.

Said placement disposition by fitting can be associated with the base region of a drinking recipient, for example a coffee cup, notably by means of a connection of thread type, and be adapted so that provides retention in removable manner on said beverage discharge support, in particular by means of placement and actuation of an element of mechanical engagement with an engagement portion on the base region of said placement disposition.

Said placement disposition by fitting presents a flow regulation disposition that provides flow passageway when the placement disposition is placed on a fluid discharge disposition, so that the flow regulation disposition is mechanically actuated by a corresponding projection in the beverage discharge support to allow flow passageway.

Document WO 2016/071880 A1 discloses a drinking recipient that can be filled from the base and a connection device to said recipient, whereby said recipient comprises a first part presenting a side wall of beverage collection space, and a second part presenting the base wall. Said first and second recipient parts can be retained in removable manner by means of a pressurized fitting of the exterior surface of the side walls of said second part inside of the side wall of said first part. Said first part comprises a flow regulation disposition, realized in the form of a wall-like deformable element that extends to the whole transversal section of said first part on the base region, so that can be deformed under the upstream flow pressure. Said second part presents a passage opening on the respective base wall and that develops in an element of tubular shape.

GENERAL DESCRIPTION OF THE INVENTION

The objective of the present invention is to provide a beverage distribution system presenting a beverage discharge disposition that provides the pressurized injection of beverage discharge flow into the interior of a drinking recipient along a direction opposite the gravity force direction, through a base region of said drinking recipients, said system being adapted so that can provide drinking recipients of simple construction, integrating flow regulation means, flow constrain means and flow sealing means, with reliable and effective retention of the base portion of drinking recipient on a respective beverage discharge disposition.

This objective is solved according to the present invention by means of a beverage preparation system according to claim 1, whereby preferred embodiments are described in the secondary claims.

In particular, the objective above is solved by means of a system whereby the drinking recipient presents a first and a second recipient parts adapted so that can be retained to each other in removable manner so that, in an assembled condition, provide fluid connection in a substantially continuous manner, without derivations of variation of form or dimension of cross-section of said flow passageway, between the region in the vicinity of flow regulation means provided upstream and the region in the vicinity of flow constrain means provided downstream, whereby said flow constrain means are preferentially provided on a second recipient part, and an entry of beverage flow in the base region of said first recipient part.

It is further preferred when the system includes a plurality of different types of drinking recipients that present retention regions of similar dimension and similar retention means, and differ in at least one of shape and dimension of the collection space of said first recipient part, construction material of at least one of said recipient parts, flow regulation means, flow constrain means and flow sealing means.

It is further preferred when the system provides the preparation of at least one type of beverage, including at least one brewing device, for preparing coffee of espresso type and other aromatic beverages, adapted for collecting a single portion of edible substance, optionally provided inside of a respective capsule.

Another objective of the present invention is to provide a process of preparation of beverages including the use of a drinking recipient and of a beverage discharge disposition, whereby the beverage discharge flow through a base region of said drinking recipient, so that the retention of drinking recipient is provided in more ergonomic manner.

This objective is solved according to the present invention by means of a process of preparation of beverages according to claim 17, whereby preferred embodiments are described in the secondary claims.

DESCRIPTION OF THE FIGURES

The invention shall hereinafter be explained in greater detail based upon preferred embodiments and on the attached Figures.

The Figures show, in simplified schematic representations.

DETAILED DESCRIPTION OF PREFERRED EMBODIMENTS OF THE INVENTION

Figure 1:
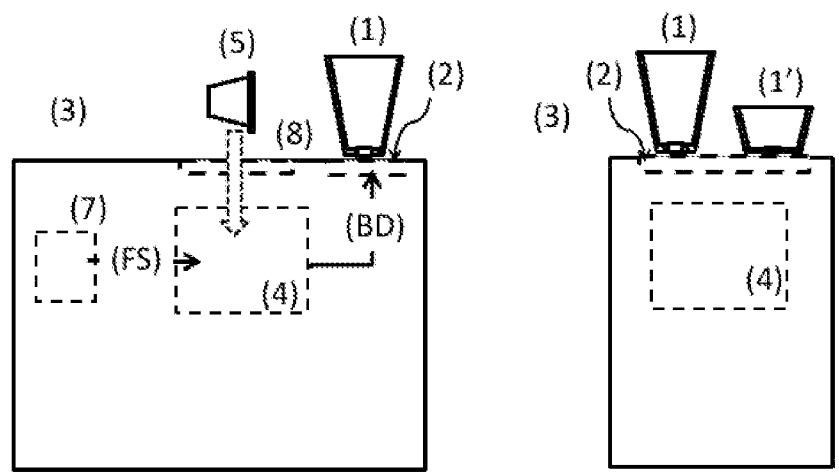
FIG. 1: side view of main components of a system according to prior art.

FIG. 1 represents side, on the left-hand side, and frontal views, on the right-hand side, of a system for distributing beverages according to prior art.

Said system comprises at least one type of drinking recipient (1, 1'), such as for example a cup or a glass, that presents a base wall (11) comprising a passageway opening (110) and a flow regulation disposition (12), whereby said drinking recipient (1) is adapted so that can be retained on a beverage discharge disposition (2).

Said system comprises a beverage apparatus (3), for example in the form of a machine for preparing espresso coffee and similar aromatic beverages, that presents at least one brewing device (4) provided as interior or exterior part of the casing of said apparatus (3), and so that can collect a portion (5) of edible substance that is precursor of beverage, for example contained in a capsule or similar, and supplied preferentially through an introduction opening (8) disposed for example in the vicinity of said beverage discharge disposition (2).

Moreover, it is preferred when said beverage apparatus (3) includes a fluid reservoir (not represented), as well as a flow pressurization device (7) and a fluid heating device (not represented), so that can supply a flow (FS) at a temperature comprised between 60 and 100° C. and pressure between 1 and 20 bar, preferentially more than 10 bar, so as to interact with said edible substance.

Said discharge flow (BD) is then conducted to an exit of said brewing device (4) and to a beverage discharge disposition (2) arranged downstream thereof and that includes at least one beverage discharge element (21) adapted so that can retain a drinking recipient (1, 1'), preferentially by means of mechanical engagement with the base region (11) thereof.

The system includes a plurality of types of drinking recipients (1, 1') presenting different dimensions, in particular different dimensions, for example diameter, of respective base walls (11), but adapted so as to engage in a same type of beverage discharge disposition (2), whereby at least one of said types of drinking recipients (1, 1') is not a disposable recipient.

Figure 2:
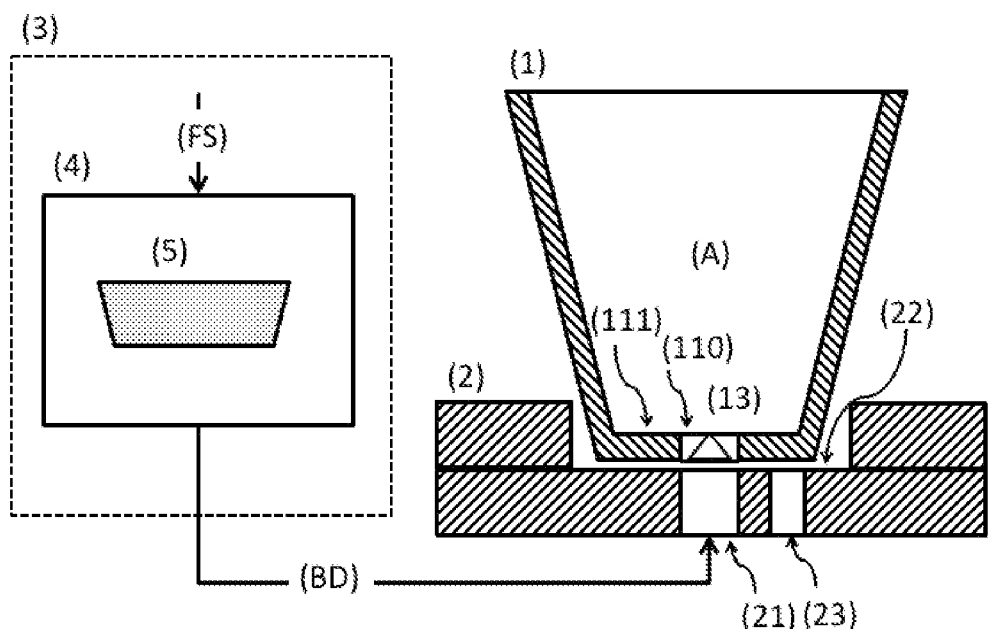
FIG. 2: diagram of a drinking recipient (1) on a beverage discharge support (2) operatively associated in fluid connection to a beverage apparatus (3) of a system according to prior art.

As represented in FIG. 2, said types of drinking recipients (1, 1') can present a flow regulation disposition (12), for example of the type one-way valve (symbolically represented by a triangle), provided retained in an opening of passageway (110) of said base wall (11) and adapted so that only provides passageway to a pressurized flow of beverage discharge (BD) downstream, to said collection space (A), in a direction opposite the gravity force, if impinged with a flow pressure bigger than a previously defined value of flow pressure.

Figure 3:
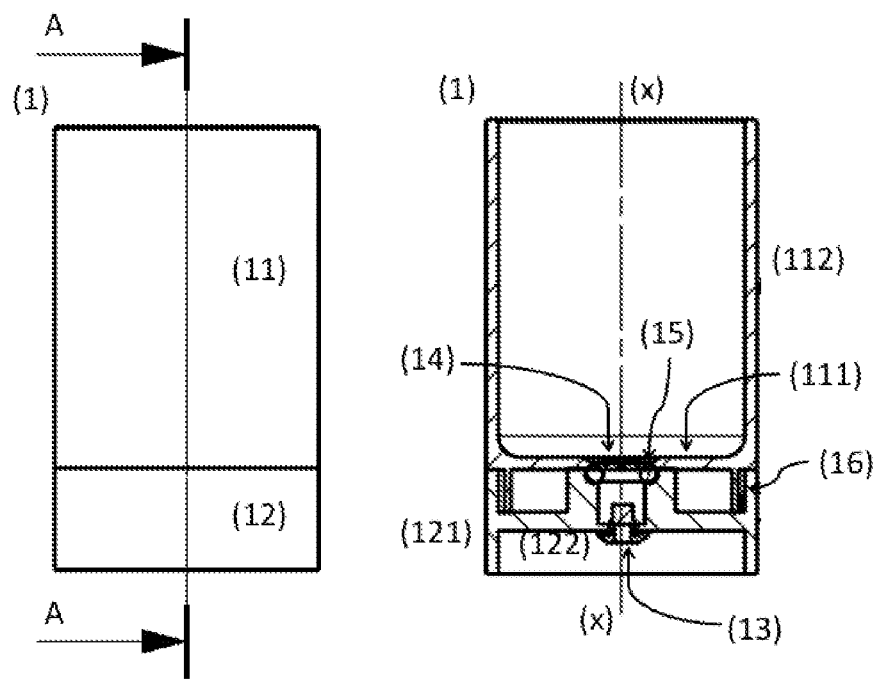
FIG. 3: side view (left-hand side) and respective side cut AA (right-hand side) of a first embodiment of a drinking recipient (1), in an assembled condition, of a system according to the present invention.
Figure 7:
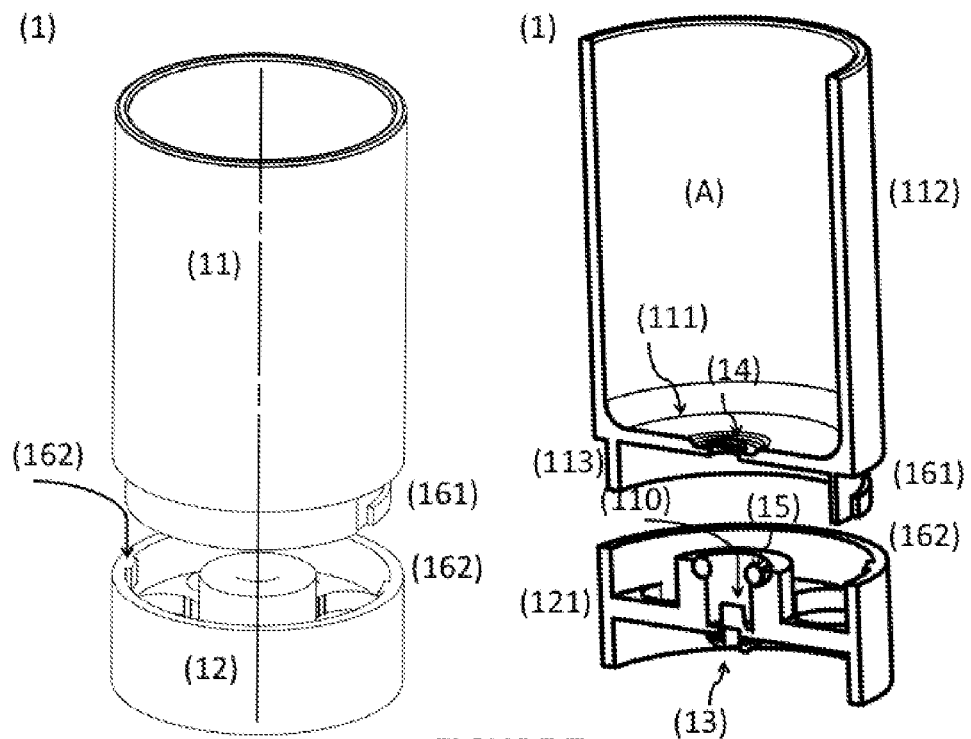
FIG. 7: perspective view (left-hand side) and perspective cut view (right-hand side) of the embodiment of a drinking recipient (1), in a disassembled condition, of a system according to the present invention.
Figure 8:
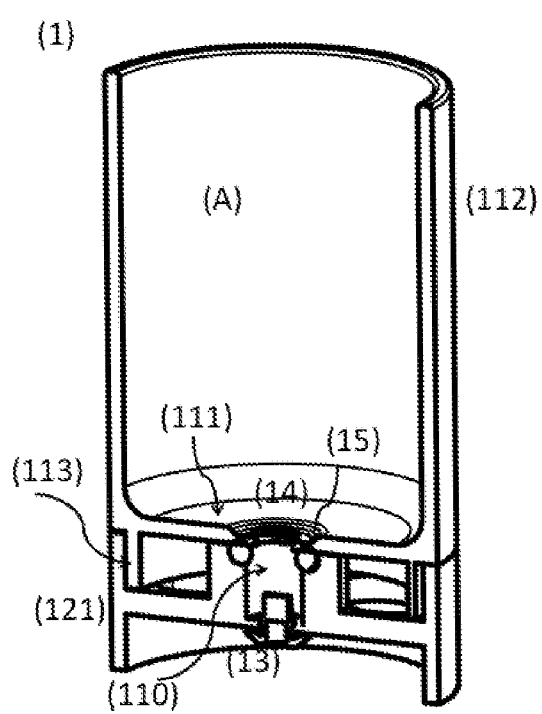
FIG. 8: perspective cut view of embodiment of a drinking recipient (1), in an assembled condition, of a system according to the present invention.

FIG. 3, and also FIGS. 7 and 8, represent a first type of drinking recipient (1) of a system according to the present invention and that comprises a first recipient part (11) that presents a beverage collection space (A) confined by a base wall (111) and by a side wall (112) that develops upwards around a longitudinal axis (X), and a second recipient part (12) adapted so that can be retained in removable manner on said first recipient parte (11). Said first and second parts (11, 12) are adapted so that, when in an assembled condition, provide a conditioned passageway of a pressurized flow into the interior of said collection space (A). Moreover, said recipient (1) presents flow regulation means (13) that only provide flow passageway if the upstream flow pressure is bigger than a previously defined value, along a direction aligned with said beverage discharge element a (21), in a condition of said drinking recipient (1) on said recipient placement support (22).

According to a first inventive aspect, said first and second recipient parts (11, 12), in a condition of assembled together, provide fluid connection through a flow passageway (110) that confines the beverage flow downstream of said flow regulation means (13), and upstream of the entry of beverage flow in the region of the base wall (111) of said collection space (A).

It is herewith provided a simple and effective functional connection in terms of flow regulation of beverage discharge, including flow regulation means (13) on a second recipient part (12), as well as a simples and modular construction of beverage recipient (1), including controlled discharge of beverage flow in the base region of said collection space (A).

Moreover, it is preferred when at least one of said first and second recipient parts (11, 12), preferentially said second recipient part (12), comprises said flow passageway (110) that develops in a single direction with one tubular shape presenting a similar transversal section and similar transversal dimension along at least most part of its extension until said entry region of beverage flow, whereby said flow passageway (110) preferentially presents a smaller transversal section at an upstream edge, in particular adapted for retention of said flow regulation means (13), and a bigger transversal section at a downstream edge, in particular adapted for retention of flow sealing means (15), in the proximity of the region of the base wall (111) of said collection space (A).

It is preferred when said drinking recipient (1) presents only one piece as flow regulation means (13), for example of the type single-way valve, and only one piece as flow sealing means (15), both of which are disposed upstream of the beverage flow entry in the region of the base wall (111) of said collection space (A).

It is preferred when at least one of said first and second recipient parts (11, 12), preferentially said second recipient part (12), presents said flow regulation means (13), preferentially disposed in the region of an edge of said flow passageway (110), preferentially in the edge region upstream thereof.

It is preferred when at least one of said first and second recipient parts (11, 12), preferentially said second recipient part (12), presents flow constraining means (14) provided so that constrain the flow by means of at least one of: a flow impact surface and a reduction of flow passage section, thereby determining the pattern of beverage flow at least in the vicinity of the base wall (111) at the entry of the beverage flow in the base wall region (111) of said collection space (A).

In the case of the embodiment represented in FIGS. 3 and 7 and 8, said flow constrain means (14) are provided in the base wall (111) of said first recipient part (11), so that they are aligned with said flow passageway (110).

It is herewith provided a simple and effective integration of flow regulation means, constrain means and sealing means, preferentially in said second recipient part, so that the construction of said first recipient part presents less constructive requirements.

It is preferred when at least one of said first and second recipient parts (11, 12), preferentially said second recipient part (12), presents flow sealing means (15) retained in the region of interface between said first and second recipient parts (11, 12), whereby said flow sealing means (15) are preferentially adapted so that are compressed in a direction parallel to the prevailing flow direction, around said flow passageway (110), when said first and second recipient parts (11, 12) are assembled together, and are preferentially provided in the form of a sealing ring, for example of "o-ring" type, or similar.

Figure 4:
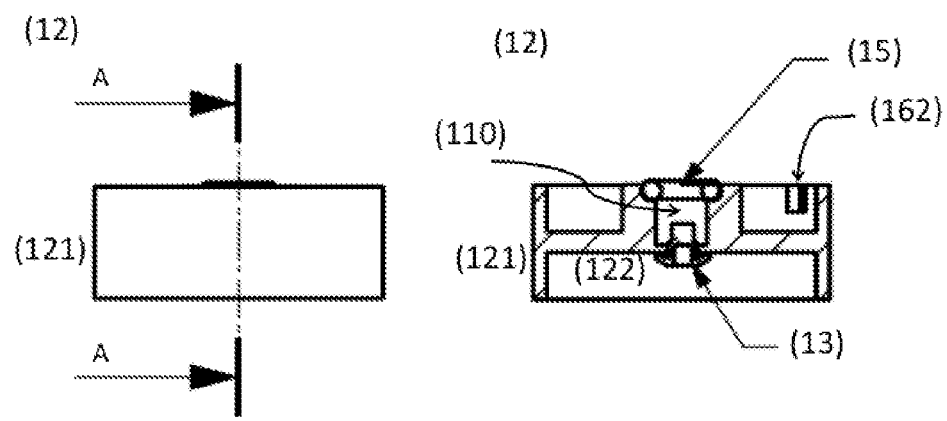
FIG. 4: side view (left-hand side) and respective side cut AA (right-hand side) of a second recipient part (12) of the embodiment of drinking recipient (1) represented in FIG. 3.
Figure 5:
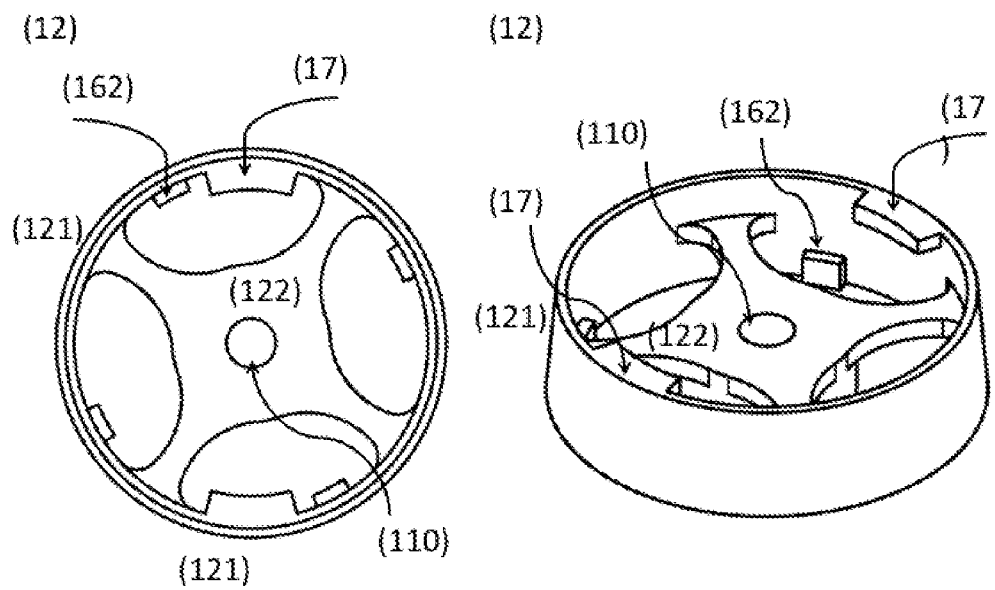
FIG. 5: top view (left-hand side) and perspective from above (right-hand side) of the second recipient part (12) of the embodiment of drinking recipient (1) represented in FIG. 3.

FIG. 4 shows the disposition of said flow sealing means (15) on said second recipient part (12).

It is particularly preferred when said first and second recipient parts (11, 12) are provided in a rigid material, preferentially in different materials including at least one of: a synthetic material, a metallic material, a ceramic material, an at least partially translucent material and an opaque material, whereby it is preferred when at least said second recipient part (12) is produced in a synthetic material.

It is herewith provided greater flexibility of use of different materials, such as for example ceramics, for the recipient part that includes the collection space, that are generally more difficult to adapt to the integration of flow regulation and constrain means.

As represented in FIGS. 7 and 8, it is further preferred when at least one of, preferentially both, of said first and second recipient parts (11, 12) present a general configuration of tubular type, including respective side walls (111, 121) configuring closed edge alignments in opposite sides, whereby one of said first and second recipient parts (11, 12) presents an edge wall projection (113) with a characteristic dimension, for example an exterior diameter, smaller than a characteristic dimension, for example exterior diameter, of the other recipient part (11, 12), so that can be inserted in the interior of the other.

According to the present invention, said first and second recipient parts (11, 12) present parts retention means (16; 161, 162) adapted so that provide manually removable retention of said second recipient part (12) in the base region of said first recipient part (11). These can be better seen in the embodiments reproduced in FIGS. 4, 5, 6 and 7.

In particular, said parts retention means (16; 161, 162) comprise at least two part retention slots (161) disposed for example in symmetric manner on a respective edge wall and configured so that guide a first translation movement along a direction parallel to said longitudinal axis (X), in particular in a direction of approach between said two recipient parts (11, 12), a rotation movement around said longitudinal axis (X) and a second translation movement along a direction parallel thereto and in opposite direction to said first translation movement, in particular in a direction of distancing apart between said two recipient parts (11, 12).

It is preferred when said parts retention means (16; 161, 162) are preferentially provided on the outwards-oriented surface of a retention projection portion (113) of one of said recipient parts (11) and on the inwards-oriented surface of the other recipient part (11, 12), so that said parts retention means (16; 161, 162) are not visible when said parts are retained one on the other.

According to a particularly advantageous aspect, said first and second recipient parts (11, 12) present parts retention means (16; 161, 162) adapted so that provide a blocking position of retention whereby said first and second recipient parts (11, 12) exert a compressing pressure upon flow sealing means (15) along the longitudinal direction (X).

FIGS. 9 to 12 reproduce two embodiments of drinking recipients (1, 1') in conditions of assembled together and disassembled.

It is preferred when one of said first and second recipient parts (11, 12), preferentially said first recipient part (11), presents at least two part retention slots (161) disposed in symmetric manner on a respective edge wall, preferentially on a outwards-oriented surface thereof.

Figure 9:
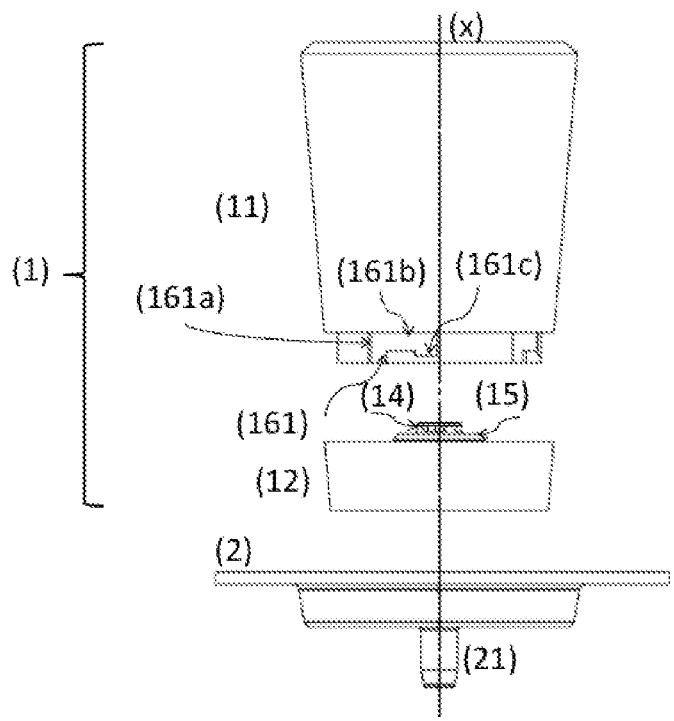
FIG. 9: side view of a second embodiment of a drinking recipient (1), in a disassembled condition, and of a beverage discharge disposition (2), of a system according to the present invention.
Figure 10:
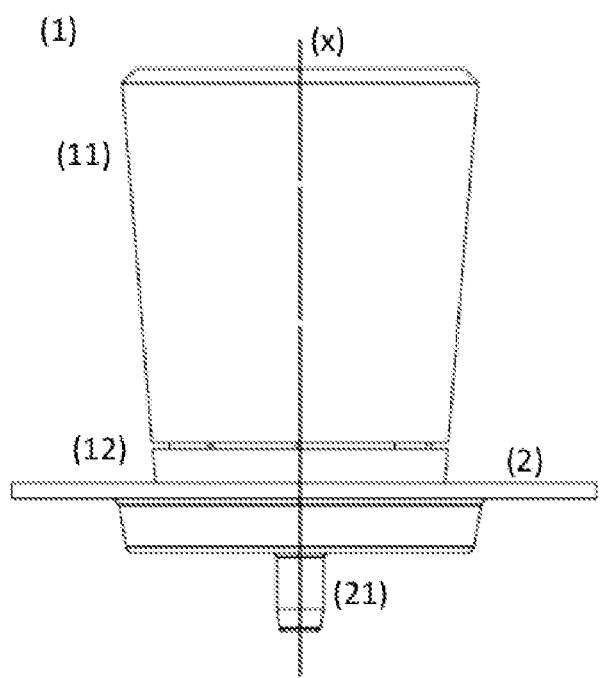
FIG. 10: side view of the embodiment represented in FIG. 9, in an assembled condition, and placed on a beverage discharge disposition (2), of a system according to the present invention.

In particular, as can be better observed in FIG. 9, it is preferred when said part retention slots (161) comprise a first section (161a) developing in a first direction parallel to the longitudinal direction (X), a second section (161b) along a second direction at least approximately transversal to said first direction, and a third section (161c) along a direction parallel to said first direction and in opposite direction with relation thereto.

In this case, the other of said first and second recipient parts (11, 12), preferentially said second recipient part (12), presents an equal number of corresponding elements of engagement parts (162) provided so that can engage on said retention slots, preferentially configured in the form of tooth-like projections or similar, in a respective edge wall, preferentially in a inwards-oriented surface thereof, whereby said two sections (161a, 161c) along the longitudinal direction (X) preferentially present an extension of at least 2 and at most 10 mm, and in that said section along the transversal direction presents an extension of at most 15 mm.

Said parts retention means (16; 161, 162) can further include mechanical clipping means by means of elastic deformation (not represented).

According to another aspect, as can be observed in FIGS. 5, 6, 11 and 13 to 16, said drinking recipients (1, 1') and beverage discharge disposition (2) are adapted so that said placement position (I) is only provided on one or two previously defined angular extensions of said drinking recipients (1, 1') with relation to said beverage discharge disposition (2).

Moreover, said drinking recipient (1, 1') presents one or two recipient retention means (17) that develop along a respective angular extension, corresponding to a perimeter segment of an edge wall in the base region of said drinking recipient (1, 1').

Moreover, said beverage discharge disposition (2) presents one or two support retention means (24) that develop along a respective angular extension bigger than the angular extensions of the, optionally corresponding, said recipient retention means (17), and so that said recipient placement position (I) is only provided along one or two previously defined segments of angular extension of said recipient placement support (22), whereby the recipient retention means (17) can pass between said support retention means (24), in a downward movement along an at least approximately vertical direction, and said retention position (II) is provided when they are actuated in a rotation movement by at least a given angle around said longitudinal axis (X) from said placement position (I), and vice-versa.

It is preferred when said one or two recipient retention means (17) develop along one or two angular extensions, each one by at least 10° and up to 50°, preferentially from 20° up to 40°, and said one or two support retention means (24) develop along an angular extension of at least 90° and up to 160°, preferentially from 110° up to 140° of a confining wall of the recipient placement support (22).

This configuration provides that said retention position (II) corresponds to a rotation movement of said drinking recipient (1, 1') on said recipient placement support (22) around said longitudinal axis (X), smaller than 110°, preferentially smaller than 90°, starting from said placement position (I), and vice-versa in a rotation movement in the opposite direction.

According to another aspect, at least one of said recipient retention means (17) and support retention means (24) is provided so that a retention position (II) can be reached from a placement position (I) only along one direction of rotation, and in that said direction of rotation in the direction of retention position (II) is preferentially the clockwise direction.

In particular, at least one of said recipient retention means (17) and support retention means (24) is provided so that a retention position (II) further includes a retention of type pressurized fitting of said recipient retention means (17) in said support retention means (24), whereby said retention of type pressurized fitting is preferentially associated with the rotation movement between the placement (I) and the retention position (II).

Figure 6:
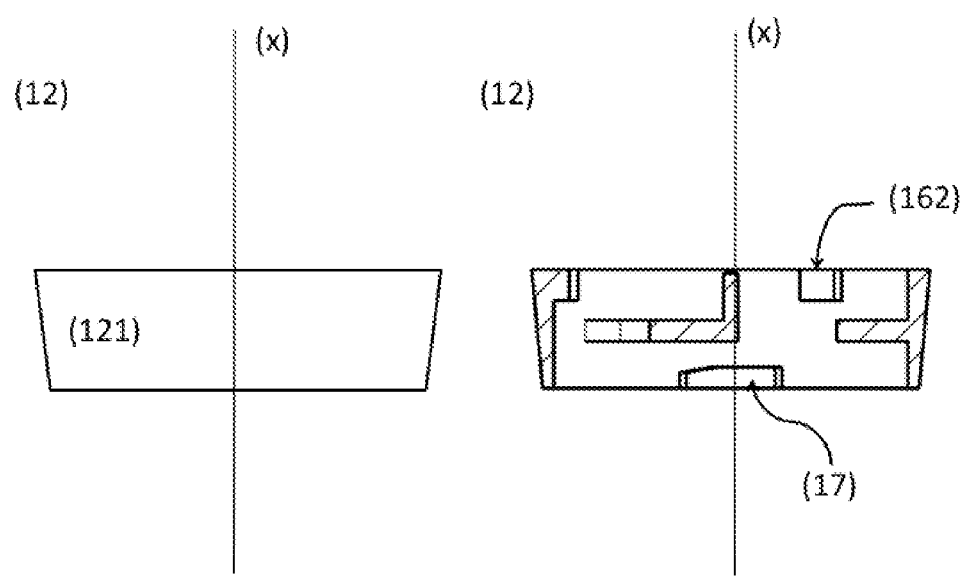
FIG. 6: top view (left-hand side) and perspective from the bottom (right-hand side) of the second recipient part (12) of the embodiment of drinking recipient (1) represented on FIG. 3.
Figure 11:
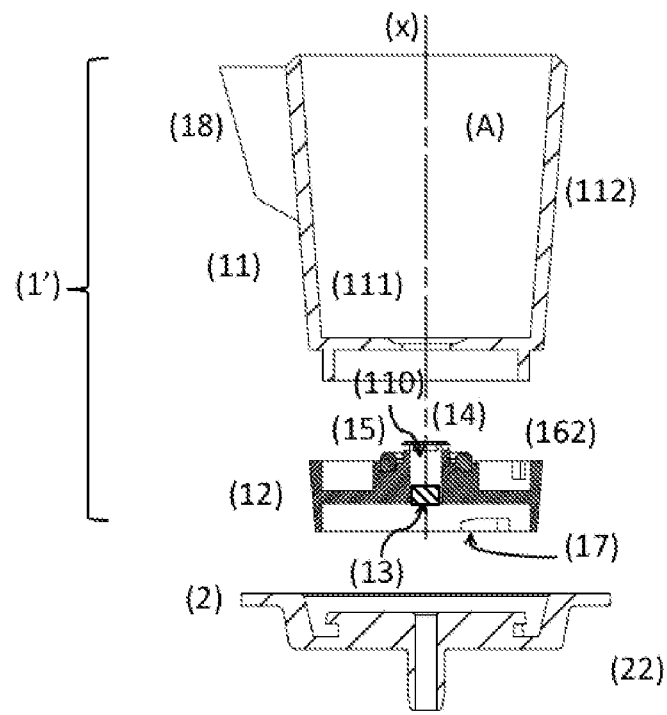
FIG. 11: side cut view of an embodiment of drinking recipient (1), in a disassembled condition, and beverage discharge disposition (2) according to the present invention.
Figure 12:
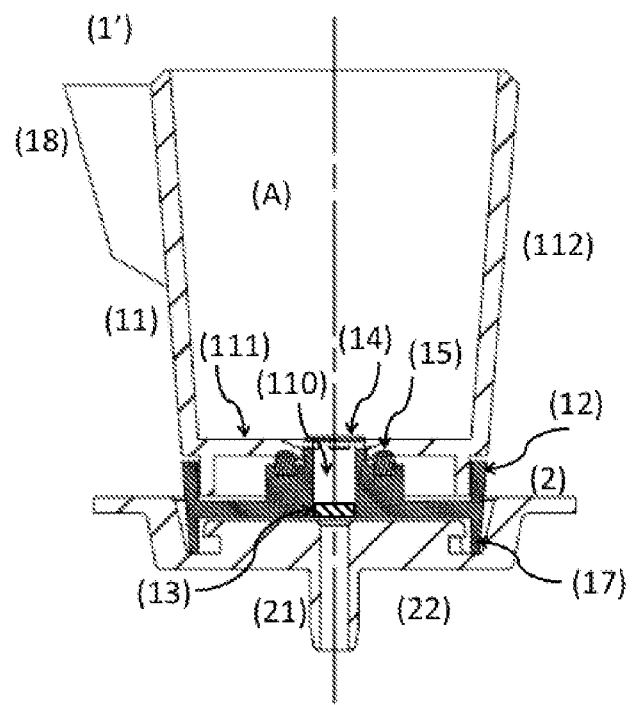
FIG. 12: side cut view of an embodiment of drinking recipient (1), in an assembled condition and placed in a beverage discharge disposition (2) according to the present invention.
Figure 13:
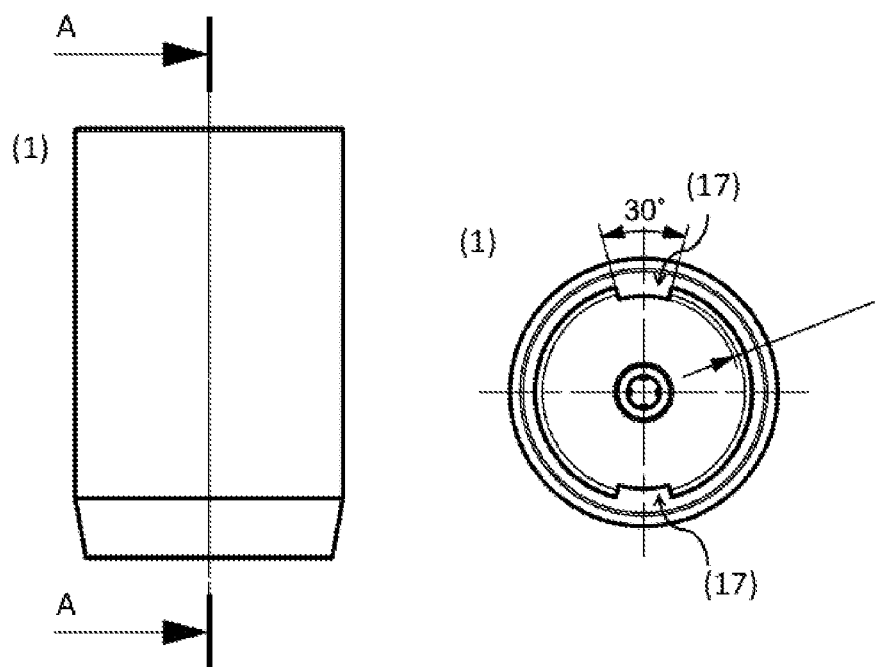
FIG. 13: side cut view (left-hand side) and inferior side view (right-hand side) of an embodiment of drinking recipient (1) of a system according to the present invention.

As can be observed in FIGS. 6 and 11, it is preferred when said recipient retention means (17) present at least one first edge along the respective extension transversal to said longitudinal axis (X), that presents a smaller first transversal section and that increases at least along the direction parallel to said longitudinal axis gradually until a second transversal section of said recipient retention means (17), thereby presenting a wedge shape or similar, so that the retention position (II) is further provided by an engagement of pressurized-fitting type of said recipient retention means (17) on said support retention means (24).

It is further preferred when said recipient (17) and base retention means (24) are adapted so that a placement position (I) is provided with relation to said recipient placement support (22), as at least one of: at least approximately in one of the second and third quadrants, preferentially at least approximately in the transition region of at least one of: a first to a second quadrant, and a third to a fourth quadrant; at least approximately mutually opposing; in different quadrants; in adjacent quadrants; in a same quadrant.

It is further preferred when said beverage discharge disposition (2) presents a recipient placement support (22) confined by an exterior confining wall and by an interior confining wall that develops around said beverage discharge element (21), whereby it is preferred when the intercalary space between said exterior and interior confining walls presents a form of ring type with a free width bigger than the thickness of the edge wall of exterior perimeter of said drinking recipient (1, 1') and smaller than the transversal extension of said recipient retention means (17) along part of their extension.

According to another preferred embodiment, said one or two recipient retention means (24) are provided as transversal projections that develop as at least one of: inward from an exterior confining wall of said recipient placement support (22), and, preferentially, outwards from an interior confining wall of said recipient placement support (22).

It is further preferred when said one or two recipient retention means (17) are provided as transversal projections that develop as at least one of: outwards from an edge wall of interior perimeter of said drinking recipient (1, 1'), and preferentially, inwards from an edge wall of the exterior perimeter of said drinking recipient (1, 1'), so that the exterior surface of said drinking recipient (1, 1') does not present any recipient retention means (17) visible on the exterior surface thereof.

In terms of the general configuration of the retention of drinking recipient (1, 1') on the beverage discharge disposition (2), it is further preferred when the top surface of said recipient retention means (24) and edge downstream of said beverage discharge element (21) are provided on an at least approximately common support plane, so that said beverage discharge element (21) does not project itself above of said top surface of said recipient retention means (24), whereby said support plane develops below a surrounding top surface of said recipient placement support (22).

It is preferred when the top surface of said recipient retention means (24) extends to the vicinity of said beverage discharge element (21) so that, in the placement position (I) on the recipient placement support (22), a base portion of the drinking recipient (1, 1') surface sits upon said support plane.

Figure 14:
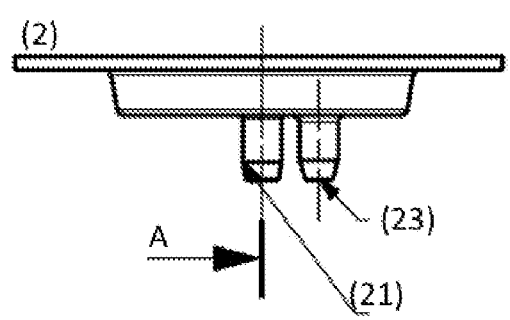
FIG. 14: side view of an embodiment of beverage discharge disposition (2)
Figure 15:
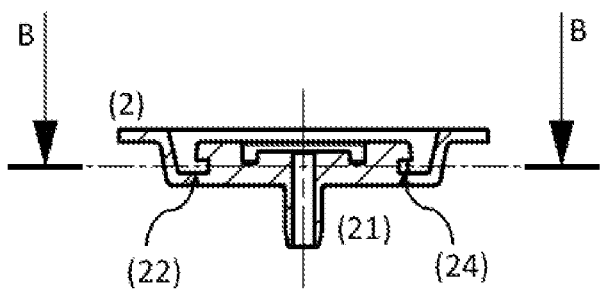
FIG. 15: side cut view AA of the embodiment represented in FIG. 14.
Figure 16:
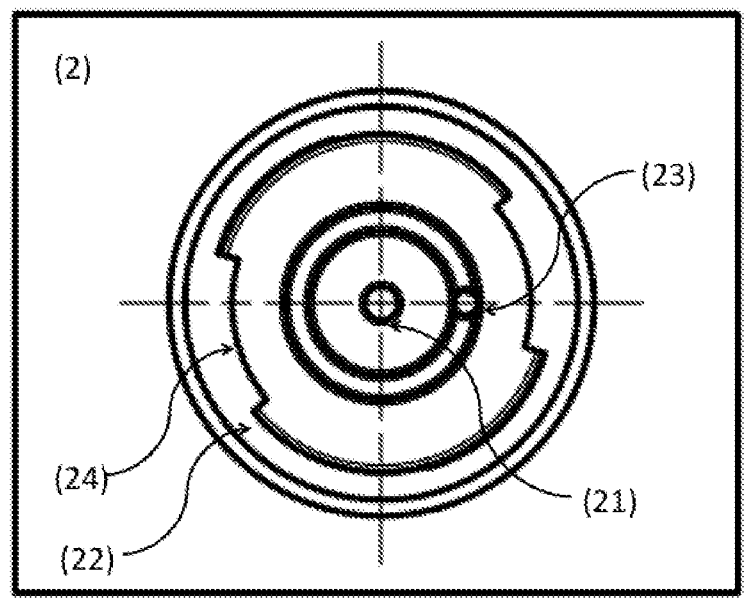
FIG. 16: top cut view BB of the embodiment represented in FIG. 14.

According to another preferred embodiment, reproduced on FIG. 14, said beverage discharge disposition (2) further comprises discharge means (23) of liquid residues provided as at least one discharge opening in fluid communication downwards, disposed in at least one surface developing at least approximately transversal manner to the beverage discharge direction and around said discharge element (21), including at least one of: a first surface next to said discharge element (21) and said recipient placement support (22), whereby said first surface and recipient placement support (22) are separated by a portion, so that eventual rests of beverage injection can be discharged to the interior of said beverage apparatus (3).

Figure 17:
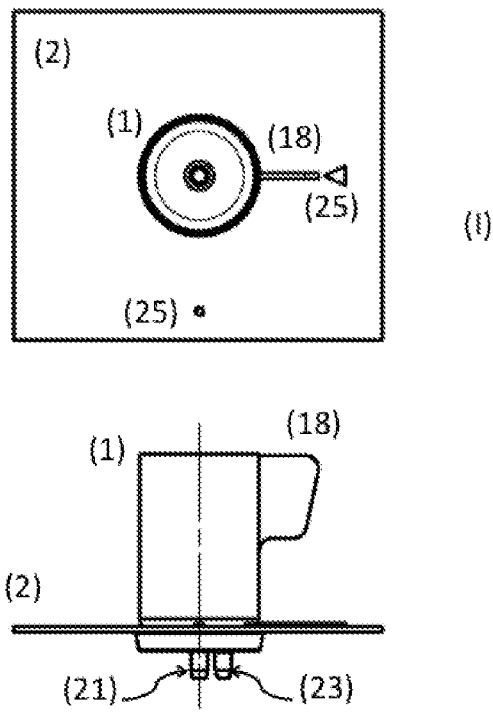
FIG. 17: top view (top) and side view (bottom) of a drinking recipient (1) and beverage discharge disposition (2) in a placement position (I), of a system according to the present invention.
Figure 18:
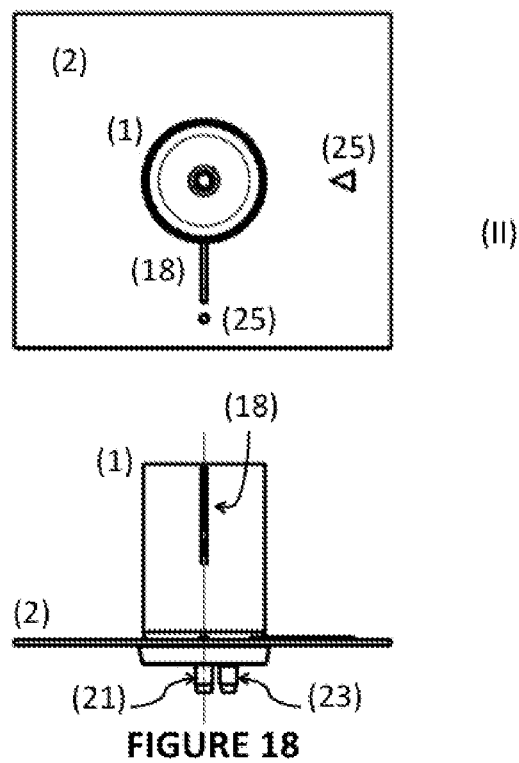
FIG. 18: top view (above) and side view (bottom) of a drinking recipient (1) and beverage discharge disposition (2) in a retention position (II), of a system according to the present invention.

FIGS. 17 and 18 show another embodiment of the present invention.

In this case, at least one of said first and second parts (11, 12) presents a recipient reference (18) provided so that it is perceptible by a user at least in visible manner, preferentially also in haptic manner, and that references at least one angular position of said drinking recipient (1, 1') that provides a placement position (I) on said beverage discharge disposition (2), whereby it is preferred when said recipient reference (18) is provided as at least one of: an indicia and a constructive portion associated with said drinking recipient (1, 1').

It is herewith advantageously provided that a user can readily recognize in which angular position to place said drinking recipient (1, 1') on a beverage discharge disposition (2), despite the retention means are not visible.

It is further preferred when said beverage discharge disposition (2) presents at least one placement reference (25) provided so that is perceptible by a user at least in visible manner, preferentially also in haptic manner, and that references at least one angular position that provides a placement position (I) of said drinking recipient (1, 1') on said beverage discharge disposition (2), and preferentially also a second placement reference (25) that references at least one angular position that corresponds to a retention position (II) of said drinking recipient (1, 1') on said beverage discharge disposition (2), whereby it is preferred when said placement reference (25) is provided as at least one of: an indicia, an information display and a constructive portion associated with said beverage discharge disposition (2).

In this particular, by means of said placement references (25) there can be provided to the user an apprehensible indication of whether the drinking recipient (1, 1') has been placed on the support on a first instant, and has been correctly retained on a second instant.

It has proven further advantageous, when said first and second recipient parts (11, 12) present respective parts and recipient retention means (16, 17) provided so that can be manually actuated in similar manner, preferentially including by means of a rotation movement around said longitudinal axis (X) along an extension smaller than 110°, preferentially smaller than 80°.

The invention claimed is:
1. A system for distribution of beverages comprising:
   at least one type of drinking recipient comprising:
      a first recipient part with a beverage collection space for a beverage fluid, the beverage collection space confined by a base wall and a sidewall extending upwards around a longitudinal axis;
      a second recipient part retained in a removable manner to said first recipient part,
      wherein, when said first and second recipient parts are operatively assembled together, a passageway for flow of the fluid extends within the first and second recipient parts to an interior of said collection space;
   at least one type of beverage apparatus comprising a beverage discharge disposition comprising a beverage discharge element configured to discharge the fluid in a direction opposite to the force of gravity, and a recipient placement support surrounding said discharge element, the discharge element is in fluid connection of a brewing device that is downstream of the brewing device and configured to collect a portion of edible substance, wherein said drinking recipient comprises flow regulation means that is configured to be actuated by a predetermined pressure of the fluid upstream of the flow regulation means when said drinking recipient is coupled to the recipient placement support and operatively connected to the discharge element, thereby only allowing the fluid to flow through the passageway when the regulation means is actuated;
   wherein when said first and second recipient parts, are operatively assembled together, the passageway con- fines the flow of fluid from a region downstream of said flow regulation means to an entry of the base wall of said collection space.

2. The system according to claim 1, wherein at least one of said first and second recipient parts, comprises said flow passageway; and
wherein said flow passageway has a tubular shape with a constant transversal section and constant transversal dimension along at least most of a length of the tubular shape, said flow passageway has a smaller transversal section relative to the constant transversal section at an upstream edge that retains within the tubular shape said flow regulation means and a bigger transversal section relative to the constant transversal section at a downstream edge that retains within the tubular shape flow sealing means in the proximity of the base wall of said collection space; and
wherein at least one of said flow regulation means or said flow sealing means is a one-piece construction that is disposed upstream of the entry of the base wall of said collection space.

3. The system according to claim 1, wherein said second recipient part, comprises said flow regulation means at an upstream edge of said flow passageway.

4. The system according to claim 1, wherein at least one of said first and second recipient parts comprises flow constraining means that constrain the flow by at least one of: a flow impact surface or a reduction of flow passage section, thereby determining a pattern of beverage flow at least in a vicinity of the base wall at the entry of the base wall region of said collection space.

5. The system according to claim 1, wherein at least one of said first and second recipient parts comprises flow sealing means retained in a region of interface between said first and second recipient parts, wherein said flow sealing means is compressed in a direction parallel to a flow direction, around said flow passageway, when said first and second recipient parts are assembled together.

6. The system according to claim 1, wherein said first and second recipient parts are made from rigid materials selected from the group consisting of a synthetic material, a metallic material, a ceramic material, an at least partially translucent material and an opaque material; and
wherein at least one of said first and second recipient parts has a general configuration of a tubular type, including side walls configuring closed edge alignments in opposite sides, whereby one of said first and second recipient parts has an edge wall projection dimensioned to be inserted within an interior of the other of said first and second recipient parts.

7. The system according to claim 1, wherein said first and second recipient parts has parts retention means for manually removable retention of said second recipient part in a base region of said first recipient part,
wherein said parts retention means comprise at least two part retention slots disposed on a respective edge wall and configured to guide a first translation movement along a direction parallel to said longitudinal axis, a rotation movement around said longitudinal axis and a second translation movement along a direction parallel thereto and in opposite direction to said first translation movement, and
wherein said parts retention means are provided on an outwards-oriented surface of a retention projection portion of one of said recipient parts and on an inwards-oriented surface of the other one of the recipient parts, so that said parts retention means are not visible when said first and second recipient parts are operatively assembled to one another.

8. The system according to claim 1, wherein said first and second recipient parts comprise parts retention means providing a blocking position of retention wherein said first and second recipient parts exert a compressing pressure upon flow sealing means along the longitudinal direction.

9. The system according to claim 8, wherein one of said first and second recipient parts comprises at least two part retention slots disposed in symmetric manner on a respective edge wall,
wherein said part retention slots comprise a first section extending in a first direction parallel to the longitudinal direction, a second section along a second direction at least approximately transversal to said first direction, and a third section along a direction parallel to said first direction and in opposite direction with relation thereto, and
wherein the other of said first and second recipient parts comprises an equal number of corresponding elements of engagement parts that can engage on said retention slots in a respective edge wall,
wherein said first and second sections along the longitudinal direction are at least 2 and at most 10 mm, and said section along the transversal direction is at most 15 mm.

10. The system according to claim 1, wherein said drinking recipient comprises recipient retention means to provide retention of said drinking recipient by a rotation movement around said longitudinal axis, between a recipient placement position on said recipient placement support, and recipient retention position retained by said base retention means, and vice-versa,
wherein said drinking recipient and beverage discharge disposition are configured so that said placement position is only provided on one or two previously defined angular positions of said drinking recipients with relation to said beverage discharge disposition.

11. The system according to claim 1, wherein said drinking recipient comprises one or two recipient retention means along a respective angular extension, corresponding to a perimeter segment of an edge wall in a base region of said drinking recipient, and
wherein said beverage discharge disposition comprises one or two support retention means along a respective angular extension bigger than the angular extensions of the one or two recipient retention means, so that said recipient placement position is only provided along one or two previously defined segments of angular extension of said recipient placement support, wherein the one or two recipient retention means is configured to pass between said support retention means, in a downward movement along an at least approximately vertical direction, and said retention position is provided when actuated in a rotational movement by at least a given angle around said longitudinal axis from said placement position, and vice-versa.

12. The system according to claim 11, wherein said one or two recipient retention means extend along one or two angular extensions, each one by at least 10° and up to 50°, and
wherein said one or two support retention means extend along an angular extension of at least 90° and up to 160° of a confining wall of the recipient placement support, so that said retention position corresponds to a rotational movement of said drinking recipient on said recipient placement support around said longitudinal axis, smaller than 110°, starting from said placement position, and vice-versa in a rotation movement in the opposite direction.

13. The system according to claim 11, wherein at least one of said one or two recipient retention means and support retention means is provided so that a retention position is reached from a placement position only along one direction of rotation.

14. The system according to claim 11, wherein at least one of said one or two recipient retention means and support retention means is provided so that a retention position further includes a retention of a pressurized type fitting of said one or two recipient retention means in said support retention means, whereby said retention of the pressurized type fitting is associated with the rotational movement between the placement and the retention position.

15. The system according to claim 10, wherein said recipient retention means has at least one first edge along the respective extension transversal to said longitudinal axis, that has a smaller first transversal section and that increases at least along a direction parallel to said longitudinal axis gradually until a second transversal section of said recipient retention means, thereby forming a wedge shape, so that the retention position is further provided by an engagement of a pressurized-fitting type of said recipient retention means on said support retention means.

16. The system according to claim 10, wherein said recipient and base retention means are configured so that a placement position is provided with relation to said recipient placement support, as at least one of:
    at least approximately in one of second and third quadrants;
    at least approximately mutually opposing;
    in different quadrants;
    in adjacent quadrants;
    in a same quadrant.

17. A process of preparation of beverages by a system according to claim 1, comprising the following steps:
    providing the first and second recipient parts;
    retaining in removable manner said first and second recipient parts while assembled together, including:
        aligning an edge part of one of said recipient parts with an edge part of other of said recipient parts;
        rotating at least one of said recipient parts around a longitudinal axis, by at least 10° and at most 100°, thereby progressing to a retention position of said recipient parts while assembled together.

18. The process according to claim 17, wherein said retention of said first and second recipient parts while assembled together further includes the steps of:
    pressuring said recipient parts one against the other, before said rotating step, thereby elastically compressing sealing means;
    releasing said recipient parts at an end of said rotating step, so that the recipient parts move apart under action of an elastic force of said sealing means, thereby reaching the final position of retention of said recipient parts.

19. The process according to claim 17, wherein further comprising the steps of:
    providing the beverage apparatus comprising a beverage discharge disposition;
    providing the recipient that comprises a base region;
    placing said drinking recipient upon said beverage discharge disposition at a placement position corresponding to one of at most two previously defined angular positions with relation to said beverage discharge disposition;
    rotating said recipient by at least 15° around said longitudinal axis of a collection space until reaching a retention position on said beverage discharge disposition;
    injecting a beverage discharge flow through said beverage discharge disposition;
    rotating said drinking recipient in the reverse direction so as to progress back to said placement position.

20. The process according to claim 17, further comprising the step of displaying a signal to a user when a given position of rotation of said drinking recipient on the beverage discharge disposition is obtained, corresponding to a position of retention of said drinking recipient thereupon.

21. The system according to claim 1, wherein said first recipient part and said second recipient part are configured to be operatively assembled together by a removable manual coupling of said first recipient part to said second recipient part to thereby form said drinking recipient, and wherein said drinking recipient is configured to be operatively coupled to the beverage discharge disposition by a removable manual coupling of the drinking recipient to the beverage discharge disposition.

22. The system according to claim 1, wherein the beverage apparatus is a machine for preparing espresso coffee.

* * * * *